No. 809,950. PATENTED JAN. 16, 1906.
I. W. HEYSINGER & A. LATSHAW.
SCALE MARKINGS FOR RULES, &c.
APPLICATION FILED FEB. 28, 1905.
2 SHEETS—SHEET 1.
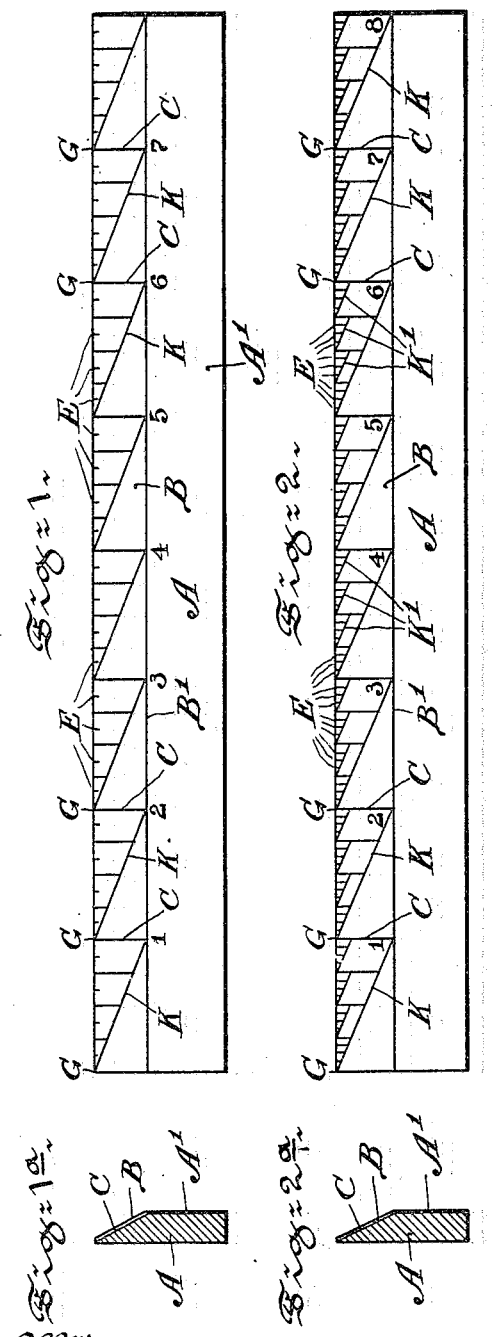
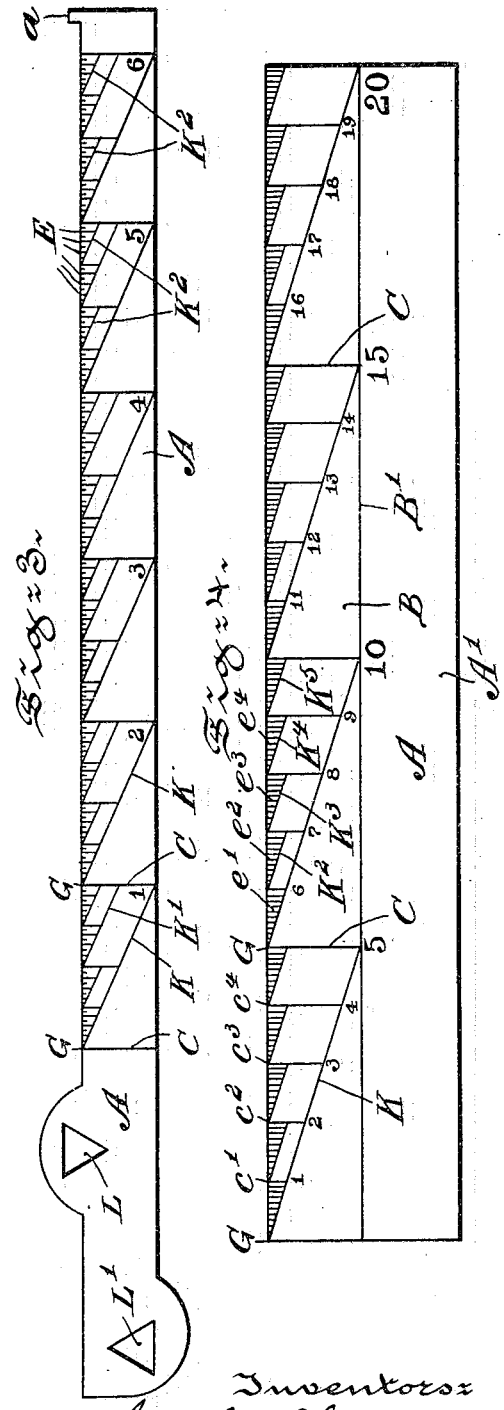

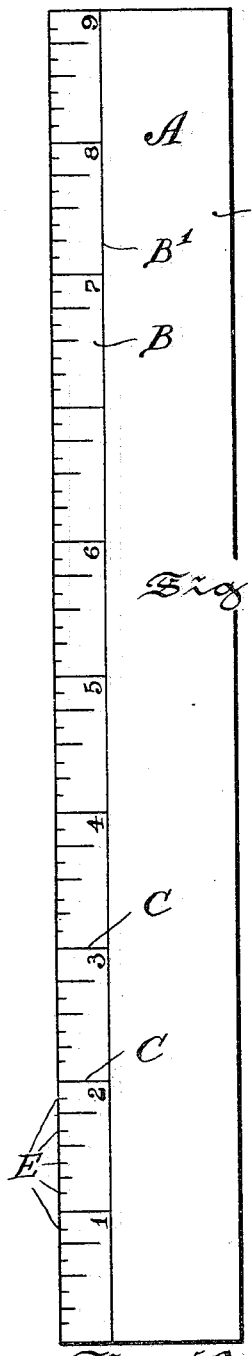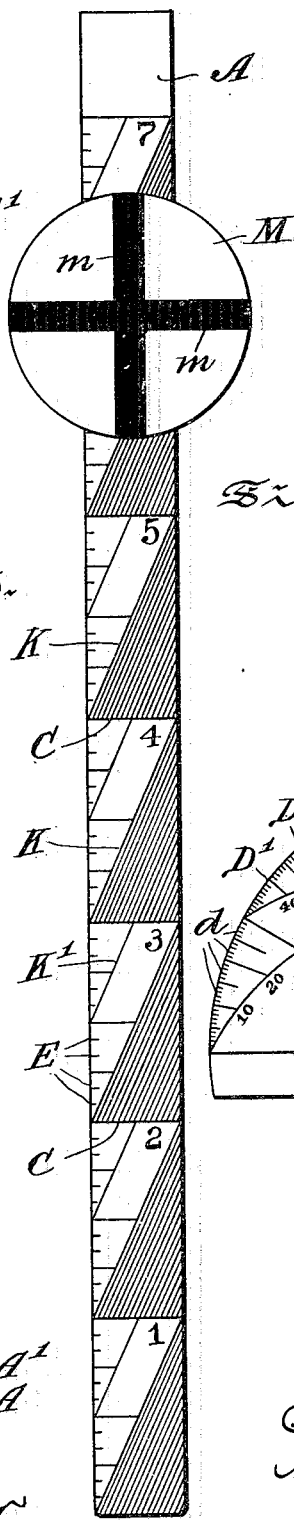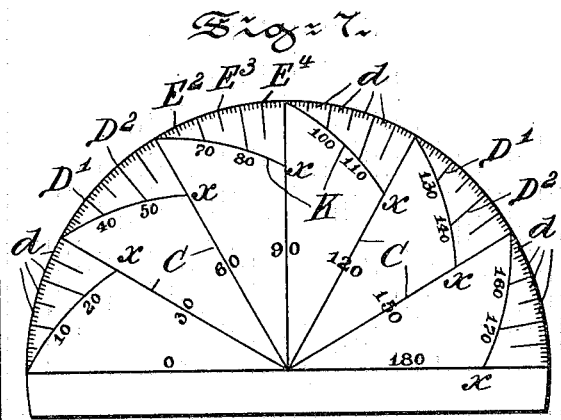

UNITED STATES PATENT OFFICE.

ISAAC W. HEYSINGER AND ALLEN LATSHAW, OF PHILADELPHIA, PENNSYLVANIA; SAID HEYSINGER ASSIGNOR TO SAID LATSHAW.

SCALE-MARKINGS FOR RULES, &c.

No. 809,950.      Specification of Letters Patent.      Patented Jan. 16, 1906.

Application filed February 28, 1905. Serial No. 247,782.

*To all whom it may concern:*

Be it known that we, ISAAC W. HEYSINGER and ALLEN LATSHAW, citizens of the United States, residing at Philadelphia, in the county of Philadelphia and State of Pennsylvania, have invented certain new and useful improvements in scale-markings for rules, scale-beams, surveyors' rods, scale-protractors, thermometers, barometers, and other like devices in which divisional and subdivisional scale indications are permanently attached for reading the measures, weights, heights, or quantities thereof, of which the following is a full, clear, and exact specification, reference being had to the drawings which accompany and form a part of this application, in which—

Figure 1 is a top view of a measuring-rule divided into longitudinal divisions and subdivisions and which embodies our invention in the construction and relations thereof. Fig. 1ª is a vertical cross-sectional view of Fig. 1 along one of the unit or inch divisions thereof. Fig. 2 is a view similar to Fig. 1, in which the divisional diagonals and the coördinate perpendiculars shown in Fig. 1 are applied also to the subdivisional markings. Fig. 2ª is a similar cross-section of Fig. 2 as Fig. 1ª is of Fig. 1. Fig. 3 is a front view of a scale-beam having our invention illustrated as applied to the scale divisions and subdivisions thereof. Fig. 4 is a top view of a measuring-rule similar to Fig. 1 and Fig. 2, in which the divisions and subdivisions are those of a decimal scale, the main divisions representing longitudinal spaces five centimeters long and the subdivisional spaces each one centimeter long, the latter divided also into tertiary subdivisions of one millimeter each. Fig. 5 represents a rule similar to those shown in Figs. 1 and 2, in which the flat surface thereof is divided into two longitudinal segments A′ and B, the former of full thickness, the latter beveled to a thin margin, and this beveled surface occupied with the spaces and cross-markings dividing the same, the cross-markings for one-fourth, one-half, and three-fourths of an inch being graded in heights proportionately to the cross-markings for one inch, the latter, with the longitudinal dividing-line B′, forming a series of elongated rectangles along the margin of the rule. Fig. 5ª is a cross-section of Fig. 5. Fig. 6 shows an ordinary surveyor's rod with sliding circle, the scale-markings of which embody our invention. This device will also illustrate the application of our invention to vertical thermometer and barometer tubes. Fig. 7 shows the application of our invention to ordinary protractors divided into arcs of thirty degrees, and these arcs subdivided into secondary arcs of ten degrees, and these into tertiary arcs of five degrees, and these again with smaller arcs of one degree each. Of course the subdivisions may be carried still further, applying our invention to minutes or even seconds, if desired. Fig. 6 also illustrates the application of our invention to the scale-markings of aneroid-barometers, circular thermometers, or weighing-scales, in which a pivoted hand traverses a circle duly marked to indicate divisions and subdivisions thereupon.

The lettering in all the figures is uniform.

Our invention relates to the construction of a connected system of scale-markings into divisions and subdivisions—primary, secondary, tertiary, or even carried further—of a permanent character, in which the divisions are coördinated to the unit divisions—such as an inch, a decameter, a pound, an ounce, an arc of a few degrees, or other main or primary divisions of said scale—so that from the beginning of each unit, and preferably along the base line or margin of said scale, such subdivisional markings shall increase gradually in perpendicular length until the next perpendicular main divisional or unit marking is reached, when the subdivisional perpendiculars again commence at the base-line and regularly increase coincidently with their longitudinal distances from the initial point at the base of the last unit division, and so on along the length of the rule or scale. We do not make these regularly-graduated lines or perpendiculars which constitute the subdivisions of the actual length of the divisions which they indicate. For example, the subdivisional line representing a half-inch from the last unit division is not a half-inch in perpendicular height from the base or margin, and a quarter-inch length is not represented by a quarter-inch perpendicular, and so on; but the perpendiculars are regularly graded in length so as to grow in height in equal proportion to the length of the unit divisions which they represent. In this wise if the unit perpendicular representing a pound weight be one and a half inches in altitude, that representing a half-pound will be three-quarters of an inch in height, and so on, for the different subdivisions. In this way, as illustrated in Figs. 1 and 1ª, 2 and 2ª, 5 and 5ª, we apply our scale-markings along the beveled half of the rule, the construction of said rule, as shown at Figs. 1ª, 2ª, and 5ª, being one half a flat surface and the remaining half or less than half being beveled off to the free margin to be applied in measuring, and this beveled part of the rule carries the whole of the markings, as shown.

In Fig. 4 no beveled side of the rule is specifically shown. It may be thin and flat throughout or beveled as in the other figures referred to.

Our invention also consists in providing the unit or main divisions with a series of scale-markings for the whole of said unit and subsidiary scale-markings for integral parts of each of said main divisions, so that the perpendicular lines of the secondary or tertiary subdivisions each has its own graduated subdivisions, the scale-markings of which form a subseries gradually increasing in length from the beginning to the end of each of said subdivisions, and especially useful for minute readings.

Our invention also consists in providing each unit or main division of the scale with a diagonal line or marking, commencing at the base or marginal edge of the scale and precisely at the bottom of the last previous main divisional perpendicular marking and extending precisely to the top of the next following main divisional perpendicular marking, thus dividing the length of the scale into a series of right-angled triangles, to which all the subdivisional perpendiculars conform as coordinates, extending transversely from said diagonal to said margin and necessarily proportionate in height to the fraction of length which they represent as compared with the total height of the unit or main divisional markings.

Our invention also consists in applying a secondary or tertiary system of correlated diagonals to smaller divisions of the unit or main divisional spaces, these latter subsidiary to and in coördination with the longitudinal measurements and perpendicular heights of the main divisional markings.

The purpose of our invention is to make the longitudinal scale-markings more graphic to prevent confusion as to subdivisional distances, such as the mistake of counting three-eighths of an inch as five-eighths or five ounces as nine ounces or the like, and also by means of said diagonals to present an acute angle as the point of departure of each division, so that these acute angles will by gradual approach of their perpendicular and hypotenuse determine far more accurately than by a mere cross-line the exact points of measurements, and which will even determine this accurately if the margin of the scale has been abraded or otherwise injured.

By means of our invention the scale-markings can be read almost instantaneously and without the liability of errors to which the readings of ordinary scales, on account of their uniformity and their indications by the mere bases of perpendicular lines of divisions instead of acute angles, are liable.

Referring to the drawings, A is the rule, scale-beam, or other longitudinally-graduated article to which our invention is applied.

A' in Figs. 1, 1ª, 2, 2ª, and 4 and 5 represents the flat upper surface of a rule, and B the longitudinally-lateral portion of the top surface occupied by the divisional markings. B' represents the longitudinal dividing-line between the unmarked and the marked portions of the rule or scale. As shown at B in Figs. 1ª, 2ª, and 5ª, this portion is beveled to a thin marginal edge, as is usual in rules of this class, and C represents the perpendicular score-line of the main divisions along the rule.

In Fig. 1 the diagonals K K˙K, &c., commence at G G G on the marginal edge of the bevel B and precisely at the points where the main divisional lines C C C intersect the margin and terminate precisely where the same intersect the longitudinal division B', thus forming a series of similar right-angled triangles from one end of the rule or scale to the other. Between these diagonals and the free margin of the rule, at coördinated distances along said margin, are erected perpendicular lines which connect said diagonals with said margin, and the opposite right-angled triangles between said diagonals and the longitudinal dividing-line B' are left blanks, excepting for the imprinting or marking of the distances or weights to which the respective perpendiculars refer.

In Fig. 1 the coördinates representing lengths of one-fourth, one-half, and three-fourths inch along the margin are proportionate to the main perpendiculars C C C, which, whatever their height, represent lengths of one inch each; but the smaller divisions E E E, which represent eighths, are merely represented by short marginal scores, the diagonals above indicating the relative positions. For more accurate rules, however, as shown in Fig. 2, we divide each longitudinal subdivision of one-quarter of an inch into a separate right-angled triangle in precisely the same manner as the main divisions are divided, excepting on a smaller scale, thus making each quarter of an inch in length a separate triangle, the hypotenuse or diagonal of which is parallel to the main diagonals of the unit measurements, and the coördinates of these longitudinal spaces, representing one-sixteenth of an inch each, are proportional in length up to their diagonals with the other perpendicular markings of the scale.

No mistake can be made in reading one of these subdivisional markings for another, while the acute angles which begin each subdivision give an accurate index for the exact space-readings. K' K' K' represent these subdiagonals, and E E E E, &c., the subdivisional coördinates.

The scale-beam shown in Fig. 3 conforms in system and arrangement with Fig. 2. L and L' are the V-shaped supports. $a$ is a stop to prevent the weight (not shown) from slipping off the end of the beam, and the coördinates are shown representing pounds, half-pounds, and quarters, extending up to the unit-diagonals K K K, while E E E, the smaller coördinates for ounces or fractions thereof, only extend up to the subdiagonals $K^2 K^2 K^2$.

In Fig. 4, where the metric system of longitudinal measurements is shown, the length of the rule is divided longitudinally into the unmarked segment A' and the scale-marked segment B separated, preferably, by the dividing-line B'. The main or unitary longitudinal divisions are units of five centimeters, although other decimal units may be employed. The main diagonals K extend from the free margin of the rule, at the base of the unitary division-marks C C C, to the top of the next succeeding one along the line B'. The right-angled triangles formed by the margin of the rule and the main division-marks C and the diagonals K are divided into lengths of one centimeter each, the dividing-lines extending as coördinates from the margin of the rule to the diagonal K, so that these marking-lines are proportional in their altitudes to the altitude of C; but these lines, by reason of the longitudinal space B making only a part of the width of the rule, do not themselves measure the actual length of the unit measurements of the rule. It is not our purpose that these unit lengths should also be equal unit heights, so that the unitary divisions form squares, but to limit these proportional division-lines to a narrow space along the marginal edge of the rule, where they may be readily read along the margin itself. The diagonal lines K K K are thus diagonals of elongated rectangles, which may be as narrow as desired to insure accurate and easy readings along the margin of the rule.

As shown in Fig. 4, the main divisions, with these diagonals K, have their marginal triangles again divided into lengths of one centimeter each, and these in turn are provided with subdiagonals $K^2 K^3 K^4 K^5$, within which from the margin are erected proportional coördinates dividing each subdivision into spaces of one millimeter in length each, the latter divisional lines being proportioned to the terminal marks $c' c^2 c^3 c^4$, as shown at $e' e^2 e^3 e^4$ at the left-hand end of Fig. 4. Fig. 5 will be clearly understood from the previous description, the elongated marginal rectangles being occupied by the subdivisional and proportionate cross-markings. Fig. 6 will also be clearly understood from the previous description. The upright rod A is divided into lengths of, say, one foot, and these rectangular spaces are divided into two right angles each by the diagonals K. We have shaded those shown to the right in order to make them more visible to the surveyor at the end of the line, where his instruments are used. The marked triangles are made like those shown, for example, in Fig. 2. The circle M, with its cross-lines $m\ m$, is made to slide up and down along the rod to make the levels as the line of survey is run. This same principle we use for thermometer or barometer tubes or other like instruments having upright readings.

Fig. 7 is an arc protractor with a semicircle divided into degrees. For convenience we divide this semicircle into six uniform segments of thirty degrees each. From the free margin of the instrument at the extremity of the main divisional lines C C C C we describe arcs with the same radius to intersect the next succeeding main divisional lines along their length. This insures a gradual proportion of the smaller divisional lines D' $D^2$ in length to the length of C from said intersection to the free margin of the arc. These diagonals, however, may be straight lines, if desired. As shown, each main division is subdivided into three smaller divisions, each measuring ten degrees by the coördinates or partial radii D' $D^2$. These smaller divisions we again subdivide into degree-spaces of five degrees each by the radial division-marks $E^2 E^3 E^4$, and each of these spaces is divided by the marginal space-lines $d\ d\ d$, which we do not show as proportional. The secondary divisional marks $E^2 E^3 E^4$ we do not carry up to the diagonal, but make them proportional to each other. If desired, they may be connected with the diagonals K, and the diagonals K also may be dispensed with in whole or part, if desired, retaining the relative proportions in length between the divisional and subdivisional markings, as compared with the length of the main divisional markings. In such case the lines C C will terminate inwardly where they are connected with the ends of the diagonals K at the points marked $x\ x\ x$.

We apply the division-numerals to represent length or weight or height in such suitable positions, as shown in the figures, as will enable them to be read at a glance and not interfere with the angles or proportions of the dividing-lines. We also modify our invention in various specific modes, as would be obvious to any skilled mechanic, to meet varying conditions and without the exercise of invention in such obvious modifications, and we also apply the same principles and constructions to other devices besides those specifically shown or described, as may be possible or obvious, our object being to describe our invention and illustrate various special modes of application to a number of simple devices in common use and where the advantages of the same can be clearly perceived.

Having now described our invention, what we claim, and desire to secure by Letters Patent, is—

1. The improvement in scale-markings for measuring devices, consisting of a rule or bar, a series of transverse, main divisional cross-markings, extending inward from the free margin of said bar, and of equal height, and a series of diagonal lines extending from the marginal end of each of said main divisional cross-markings to the top of the next succeeding main cross-marking, and a series of subdivisional coördinates parallel with said main cross-markings, and connecting said diagonals with the free margin of said bar, together with a series of numerals or the like contiguous to said markings, and adapted to interpret the same, substantially as described.

2. As an article of manufacture, a measuring-rule having one portion thereof longitudinally flat, and the remaining portion beveled to the measuring-margin of said rule, said bevel provided with the divisional markings of said rule, and the flat portion without said markings, said markings consisting of a series of equal, parallel main divisional lines extending across said bevel and at right angles to the margin thereof, said main divisional lines dividing said bevel into a continuous series of rectangular parallelograms, said parallelograms divided by diagonal markings, into two equal right-angled triangles, and subdivisional cross-markings parallel to said main divisional markings, extending from the free margin of the bevel of said rule to the said diagonal, and suitable numerals or the like adapted to interpret the lengths of the same along said margin, substantially as and for the purposes required.

3. As an article of manufacture, a measuring device having its measuring-margin divided into a series of parallelograms, the long sides thereof coincident with said margin, and said parallelograms divided each into two equal right-angled triangles, the apex of each marginal triangle constituting the beginning-point of the longitudinal measurements of each of said parallelograms, and the subdivisional cross-markings extending from the free margin thereof to the said diagonal, and subordinate subdivisions composed of parallel, and equally-directed smaller right-angled triangles, within said main triangles, the subordinate cross-markings thereof, to indicate subordinate lengths along said margin, parallel with the other cross-markings, and connecting said free margin with said subordinate diagonals, substantially as and for the purposes described.

4. As an article of manufacture a measuring device consisting of a base, and along said base a series of right-angled triangles, the apices thereof turned toward the beginning of said base, and the bases of each of said triangles constituting the point of departure of the next succeeding triangle, and a series of cross-markings extending across said triangles, at equal distances along said margin, and at right angles thereto, said cross-markings proportionate, along each triangle, to the altitude of the base of said triangle as compared with the longitudinal measurements along the free margin thereof, substantially as described.

5. A longitudinal measuring device consisting of a bar of suitable length, the upper surface divided longitudinally into two lateral segments, one of said segments left plain, and the body thereof adapted to give substance and weight to said measuring device, and the other of said segments provided with a series of elongated rectangles constituting main divisions, and with a graduated series of longitudinal subdivisions, indicated by cross-markings extending, at right angles from the free margin thereof inward across said marked segment, said subordinate cross-markings having a proportionate and gradually-increased height from said margin, corresponding to the gradually-increased length along said margin, but said cross-markings not equal in actual heights to the lengths of said marginal measurements, substantially as described.

ISAAC W. HEYSINGER.
ALLEN LATSHAW.

Witnesses:
WILLIAM H. F. WARD,
MARY KESSLER.